(12) United States Patent
Farrell

(10) Patent No.: US 6,244,484 B1
(45) Date of Patent: Jun. 12, 2001

(54) COLLAPSIBLE, STORAGE PACK FOR VEHICLES

(76) Inventor: Bruce J. Farrell, 1713 25th Ave., North, St. Petersburg, FL (US) 33713

( * ) Notice: Subject to any disclaimer, the term of this patent is extended or adjusted under 35 U.S.C. 154(b) by 0 days.

(21) Appl. No.: 09/493,729

(22) Filed: Jan. 28, 2000

(51) Int. Cl.$^7$ .................................................. B65D 33/06
(52) U.S. Cl. ........................ 224/539; 190/111; 190/903; 383/6; 383/41; 383/66; 383/97
(58) Field of Search .................... 190/903, 111; 383/66, 97, 41, 6; 224/539; 296/37.8, 37.15

(56) References Cited

U.S. PATENT DOCUMENTS

| | | | |
|---|---|---|---|
| 1,557,382 | * 10/1925 | Sundback | 296/37.15 |
| 2,115,993 | * 5/1938 | Kranhold | 190/903 |
| 2,310,627 | * 2/1943 | Greene | 190/903 |
| 2,563,929 | * 8/1951 | Freund et al. | 383/41 |
| 3,213,628 | * 10/1965 | Serota | 383/6 |
| 3,473,713 | * 10/1969 | Campbell | 383/6 |
| 3,708,045 | * 1/1973 | Katz | 190/903 |
| 3,965,953 | * 6/1976 | Becker et al. | 383/6 |
| 3,971,458 | * 7/1976 | Koenig | 190/903 |
| 4,029,244 | 6/1977 | Roberts | 224/42.42 |
| 4,112,990 | * 9/1978 | Anderson | 190/903 |
| 4,718,584 | 1/1988 | Schoeng | 224/42.42 |
| 4,848,628 | * 7/1989 | Lopez | 224/539 |
| 5,007,250 | * 4/1991 | Musielak | 190/903 |
| 5,215,205 | 6/1993 | Behlman | 220/4.31 |
| 5,419,471 | 5/1995 | Polumbaum et al. | 224/42.42 |
| 5,492,257 | 2/1996 | Demick | 224/275 |
| 5,538,148 | 7/1996 | Indyk | 211/195 |
| 5,706,940 | * 1/1998 | Amarello | 383/41 |
| 5,871,280 | * 2/1999 | Watters | 383/41 |

* cited by examiner

*Primary Examiner*—Stephen P. Garbe
(74) *Attorney, Agent, or Firm*—Joseph N. Breaux

(57) ABSTRACT

A storage bag for use to conceal items within the passenger or back floor areas of a vehicle. The storage pack includes four fabric pack side surfaces, a fabric pack bottom surface and a fabric pack top surface. The pack top surface has a straight zipper provided for access into a compartment. Each of the four fabric pack side surfaces includes two according fold collapsible vertical side edges, a curved zipper for access into the compartment, and two fabric handles each having a D-shaped portion defining a hand receiving opening. Each of the zippers includes a locking fixture that is lockable to the zipper tab with a luggage lock of the like.

1 Claim, 3 Drawing Sheets

COLLAPSIBLE, STORAGE PACK FOR VEHICLES

TECHNICAL FIELD

The present invention relates to storage and transport bags and the like and more particularly to a collapsible, storage pack for vehicles that includes four fabric pack side surfaces, a fabric pack bottom surface and a fabric pack top surface; the pack top surface having a straight zipper provided for access into a compartment that includes a locking fixture for locking the zipper tab of the straight zipper in a closed position with a luggage lock or the like; each of the four fabric pack side surfaces including according fold collapsible vertical side edges, a curved zipper for access into the compartment that includes a locking fixture for locking the zipper tab of the curved zipper in a closed position with a luggage lock or the like, and two fabric handles each having D-shaped portion defining a hand receiving opening.

BACKGROUND ART

It is often not prudent to leave valuable items, such a stereo equipment, video cameras, purses and the like in plain view in the passenger compartment of a vehicle or in areas such as the back floor of a sport utility vehicle. Once a potential thief identifies a desirable item, it is a simple matter for the thief to mash a window and quickly snatch the items prior to fleeing the cene. It would be desirable, therefore, to have a storage pack for vehicles that included a compartment that could be kept inside of a vehicle and within which various items could be concealed when not in use. Because it could be desirable to bring the items inside at night or when stopping at motels or the like during a trip, it would be a further benefit to have a storage pack for vehicles that included a handles on each of the sides to allow one or more persons to easily carry the storage pack from the vehicle to a storage location.

GENERAL SUMMARY DISCUSSION OF INVENTION

It is thus an object of the invention to provide a collapsible, storage pack for vehicles that includes four fabric pack side surfaces, a fabric pack bottom surface and a fabric pack top surface; the pack top surface having a straight zipper provided for access into a compartment that includes a locking fixture for locking the zipper tab of the straight zipper in a closed position with a luggage lock or the like; each of the four fabric pack side surfaces including according fold collapsible vertical side edges, a curved zipper for access into the compartment that includes a locking fixture for locking the zipper tab of the curved zipper in a closed position with a luggage lock or the like, and two fabric handles each having D-shaped portion defining a hand receiving opening.

Accordingly, a collapsible, storage pack for vehicles is provided. The collapsible, storage pack for vehicles includes four fabric pack side surfaces, a fabric pack bottom surface and a fabric pack top surface; the pack top surface having a straight zipper provided for access into a compartment that includes a locking fixture for locking the zipper tab of the straight zipper in a closed position with a luggage lock or the like; each of the four fabric pack side surfaces including according fold collapsible vertical side edges, a curved zipper for access into the compartment that includes a locking fixture for locking the zipper tab of the curved zipper in a closed position with a luggage lock or the like, and two fabric handles each having D-shaped portion defining a hand receiving opening.

BRIEF DESCRIPTION OF DRAWINGS

For a further understanding of the nature and objects of the present invention, reference should be ma de to the following detailed description, taken in conjunction with the accompanying drawings, in which like elements are given the same or analogous reference numbers and wherein.

EXEMPLARY MODE FOR CARRYING OUT THE INVENTION

Figure 1:
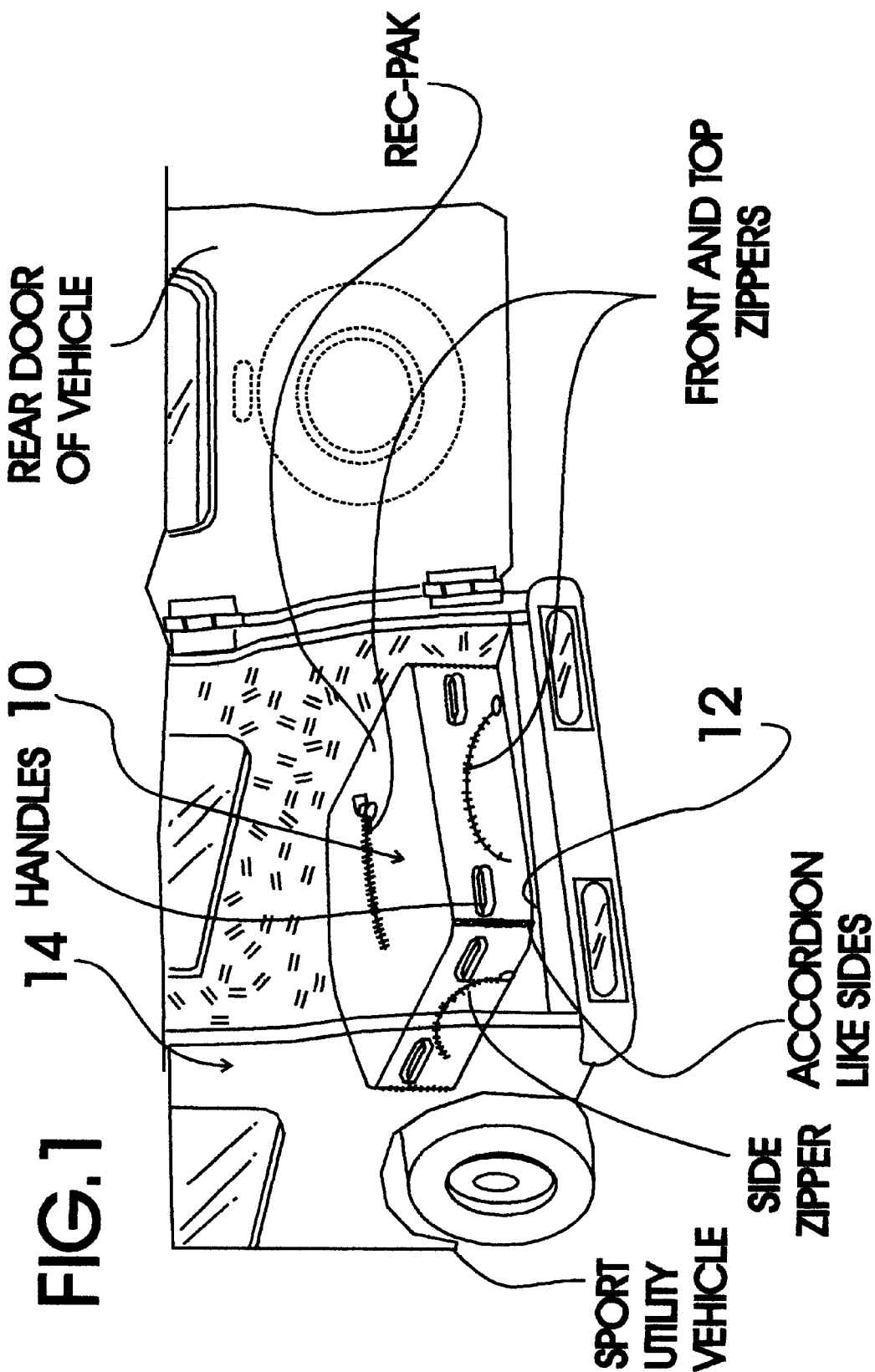
FIG. 1 is a perspective view of an exemplary embodiment of the collapsible, storage pack for vehicles of the present invention positioned onto the back floor of a sport utility vehicle showing two of the four pack side surfaces and the pack top surface; the pack top surface having a straight zipper with a locking fixture provided for access into a compartment; each of the four pack side surfaces including according fold collapsible vertical side edges, a curved zipper with a locking fixture for access into the compartment, and two handles each having D-shaped portion defining a hand receiving opening.
Figure 2:
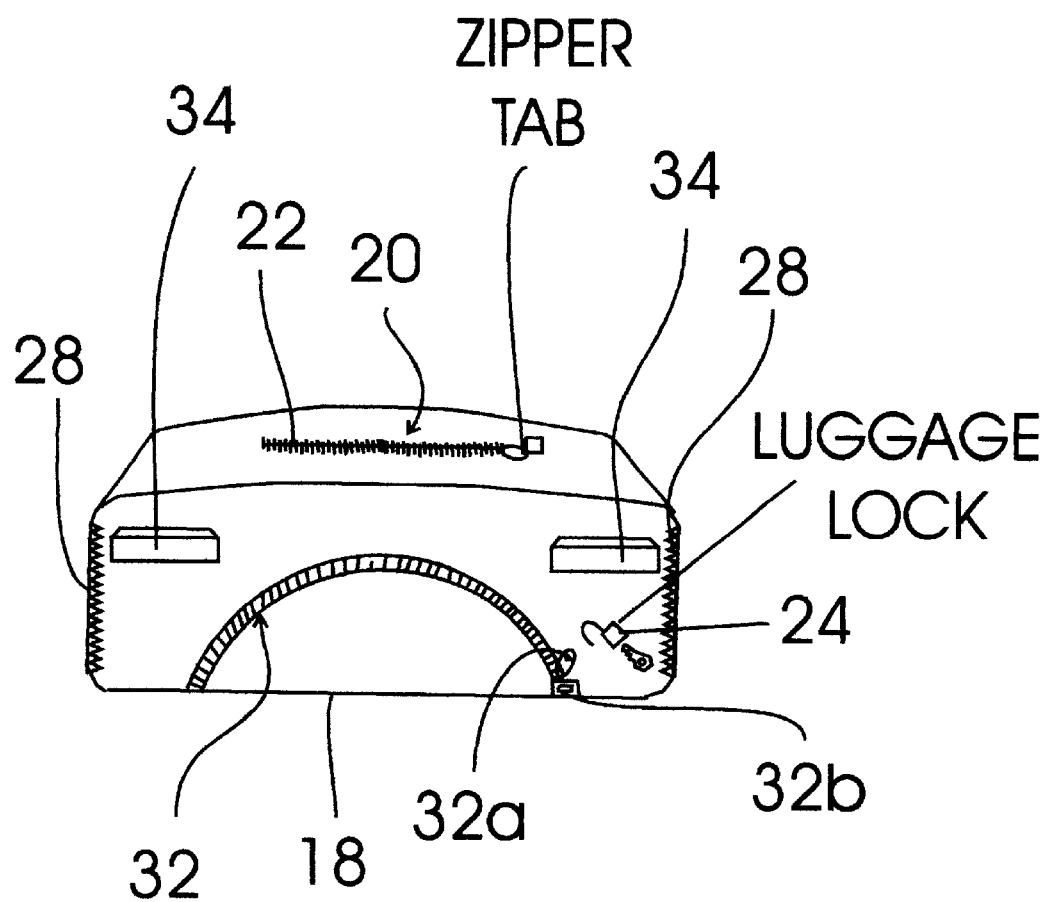
FIG. 2 is a side plan view of the collapsible, storage pack for vehicles of FIG. 1 showing one of the four pack side surfaces including two of the according fold collapsible vertical side edges, the curved zipper with the locking fixture, and the two handles.
Figure 3:
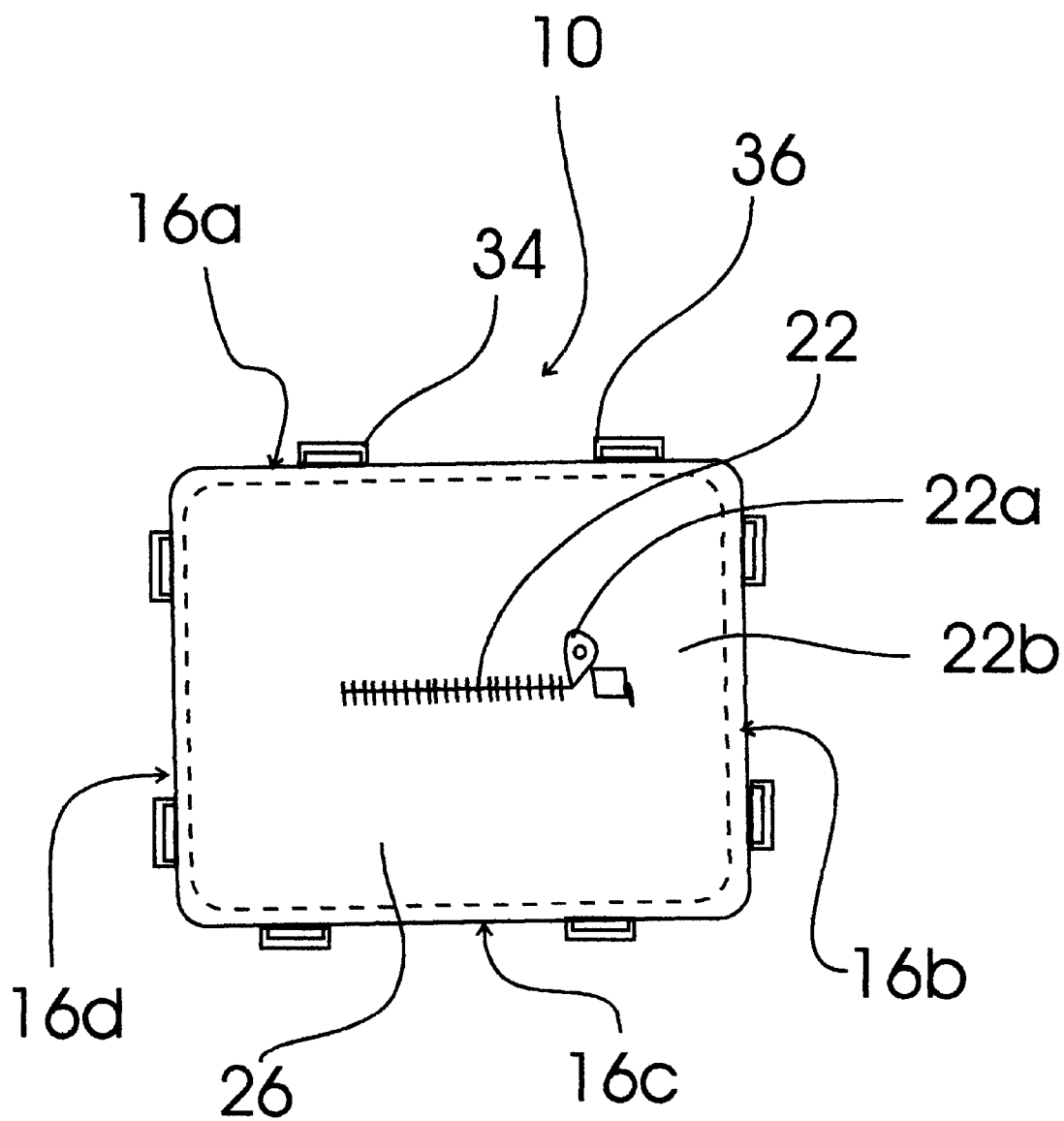
FIG. 3 is a top plan view of the collapsible, storage pack for vehicles of FIG. 1 showing the compartment shown in dashed lines, the top zipper and the eight handles each having D-shaped portion defining a hand receiving opening.

FIGS. 1–3 show an exemplary embodiment of the collapsible, storage pack for vehicles of the present invention, generally designated 10, positioned onto the back floor 12 of a representative sport utility vehicle, generally designated 14, and in isolation. Storage pack 10 is of stitched canvas construction and includes four pack side surfaces, generally designated 16a–d; a pack bottom surface 18 and a pack top surface, generally designated 20. Pack top surface 20 includes a straight zipper 22 having a zipper tab 22a that is lockable to an included locking fixture 22b with a conventional luggage or padlock 24. Straight zipper 22 provides access into a compartment 26 (shown in dashed lines FIG. 3).

Each of the four pack side surfaces 16a–d includes two accordion fold collapsible vertical side edges 28, a curved zipper, generally designated 32, and two fabric handles 34 each having a D-shaped portion defining a hand receiving opening 36. Each curved zipper 32 has a zipper tab 32a lockable to a provided locking fixture 32b. Each curved zipper 32 provides access through one of the side surfaces 16a–d into compartment 26 (shown in dashed lines FIG. 3).

It can be seen from the preceding description that a collapsible, storage pack for vehicles has been provided that includes four fabric pack side surfaces, a fabric pack bottom surface and a fabric pack top surface; the pack top surface having a straight zipper provided for access into a compartment that includes a locking fixture for locking the zipper tab of the straight zipper in a closed position with a luggage lock or the like; each of the four fabric pack side surfaces including according fold collapsible vertical side edges, a curved zipper for access into the compartment that includes a locking fixture for locking the zipper tab of the curved zipper in a closed position with a luggage lock or the like, and two fabric handles each having D-shaped portion defining a hand receiving opening.

It is noted that the embodiment of the collapsible, storage pack for vehicles described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A collapsible, storage pack for vehicles comprising:

four fabric pack side surfaces;

a fabric pack bottom surface; and a fabric pack top surface;

said pack top surface having a straight zipper provided for access into a compartment;

each of said four fabric pack side surfaces including vertical side edges, a curved zipper for access into said compartments, and two fabric handles each having D-shaped portion defining a hand receiving opening.

* * * * *